United States Patent
Smith, Jr.

(10) Patent No.: US 10,748,216 B2
(45) Date of Patent: Aug. 18, 2020

(54) MOBILE SYSTEM FOR GENERATING A DAMAGED VEHICLE INSURANCE ESTIMATE

(71) Applicant: Audatex North America, Inc., Addison, TX (US)

(72) Inventor: John Martin Smith, Jr., Escondido, CA (US)

(73) Assignee: Audatex North America, Inc., Addison, TX (US)

( * ) Notice: Subject to any disclaimer, the term of this patent is extended or adjusted under 35 U.S.C. 154(b) by 402 days.

(21) Appl. No.: 14/513,027

(22) Filed: Oct. 13, 2014

(65) Prior Publication Data

US 2015/0106133 A1 Apr. 16, 2015

Related U.S. Application Data

(60) Provisional application No. 61/890,986, filed on Oct. 15, 2013.

(51) Int. Cl.
*G06Q 40/00* (2012.01)
*G06Q 40/08* (2012.01)

(52) U.S. Cl.
CPC .................... *G06Q 40/08* (2013.01)

(58) Field of Classification Search
CPC ..................................................... G06Q 40/08
USPC ................................................ 705/35–40, 4
See application file for complete search history.

(56) References Cited

U.S. PATENT DOCUMENTS

| | | | | |
|---|---|---|---|---|
| 9,613,413 B2* | 4/2017 | Hasselbusch | .......... | G06T 7/0006 |
| 2011/0313651 A1* | 12/2011 | Hyde | .......... | G08B 3/10 |
| | | | | 701/400 |
| 2011/0313951 A1* | 12/2011 | Cook | .......... | G06Q 10/04 |
| | | | | 705/400 |
| 2013/0218761 A1* | 8/2013 | Kwasny | .......... | G06Q 10/20 |
| | | | | 705/39 |

FOREIGN PATENT DOCUMENTS

| | | |
|---|---|---|
| CN | 101242379 A | 8/2008 |
| CN | 103297697 A | 9/2013 |

OTHER PUBLICATIONS

Literature ISBN (Paper) 978-1-4244-1273-0: Applying Image Analysis to Auto Insurance Triage: Mar. 10, 2008 (Year: 2008).*
International Search Report and Written Opinion dated Feb. 3, 2015 (13 pages).

(Continued)

*Primary Examiner* — Bruce I Ebersman
*Assistant Examiner* — John A Anderson
(74) *Attorney, Agent, or Firm* — Baker Botts L.L.P.

(57) ABSTRACT

An apparatus and method for generating a damaged vehicle estimate for a damaged vehicle. A mobile device is used to capture a photo image of the damaged vehicle and receive vehicle information from a user. The mobile device displays a graphical image of the damaged vehicle. A user can provide input on the graphical image that indicates a location of damage on the damaged vehicle. The photo image, marked graphical image and the vehicle information are transferred from the mobile device to a computer where a damaged vehicle estimate is generated. The damaged vehicle estimate is transferred to the mobile device and displayed to a user.

11 Claims, 9 Drawing Sheets

(56) References Cited

OTHER PUBLICATIONS

Chinese Second Office Action dated Jul. 12, 2019; Patent Application No. 201480068505.X, with translation.
National Intellectual Property Administration, P.R. China, Decision on Rejection dated Jan. 3, 2020; Patent Application No. 201480068505.X, with translation.
Australian Examination Request No. 2, Application No. 2014337558. dated Mar. 26, 2020.

* cited by examiner

| | | | |
|---|---|---|---|
| Claim # : 2345634523541234 | Desc: | Status: Assigned | Gross Total: |

VIN Selection

| Assignment VIN | Inspection VIN  *102* | Reason For No VIN |
|---|---|---|
| [ Copy ] | WDBWK54F86F121718 | [ ▼ ] |
| | AudaVIN Information Received. | |

Vehicle Information

⦿ Vehicle Selection  *104*  ○ Vehicle Not Listed   *106*        *108*

| Origin: | European ▼ | Make: | Mercedes-Benz ▼ | Year: | 2006 ▼ |
|---|---|---|---|---|---|
| Model: | SLK280 ▼ | Style: | STD 2D Convertible 2WD Gasoline ▼ | | |
|  | *110* |  | *112* | | |
| Engine: | 6cyl Gasoline 3.0 ▼ | Transmission: | 7-Speed Automatic ▼ | | |
| Mileage: | *114* | Typical Mileage: | *116* | Mileage Type: | Actual ▼ |

Other Vehicle Information

| Lic. Plate: | | Lic. State: | ▼ | Lic. Expire: | |
|---|---|---|---|---|---|
| Condition: | ▼ | Veh Insp#: | | Prod Date: | |

|  | Paint Code | Color |
|---|---|---|
| Exterior: | | |
| Interior Trim: | | |

---

| Claim # : 2345634523541234 | Desc: | Status: Assigned | Gross Total: |
|---|---|---|---|
| 2006 Mercedes-Benz SLK280 | Packages and Options   Aftermarket Items | | |

Packages | Package Description

118 →
- ☐ Comfort Package(T)
- ☐ Heating Package(T)
- ☑ *Premium Package*
- ☐ Wood Trim Package

*Comfort Package(T)*
-Includes Automatic Dimming Mirror, Driver Seat Memory, Dual Power Seats, Pwr Tilt/Tele. Str Wheel
*Heating Package(T):*
-Included Heated Front Seats, AIRSCARF Ventilated Headrest
*Premium Package:*

Options

Optional Equipment

120 →
| | | |
|---|---|---|
| ☐ Automatic Dimming Mirror(T) | ☐ Cargo/Trunk Liner | ☐ Cellular Telephone |
| ☐ Driver Seat Memory(T) | ☐ Dual Power Seats(T) | ☑ *Garage Door Opener* |
| ☐ Headlight Washers | ☐ Heated Front Seats(T) | ☐ Harman Kardon Sound Sys |
| ☑ *AM/FM In-dash CD Changer* | ☐ Leather/Wood Steer Wheel | ☑ *Metallic Paint* |
| ☐ Navigation System | ☐ Pwr Tilt/Tele. Str Wheel(T) | ☐ Run-Flat/Self-Seal Tires |
| ☑ *Rain-Sensing W/S Wipers* | ☐ Sirius Satellite Radio | ☐ Tire Pressure Monitor |
| ☐ Wood Interior Trim | ☐ Xenon Headstamps | |

Optional Equipment
| | | |
|---|---|---|
| ☑ *Anti-lock Brakes* | ☑ *Air Conditioning* | ☑ *Alarm System* |

☐ None        (S)Standard, (T) - Typical             *100*

MOBILE SYSTEM FOR GENERATING A
DAMAGED VEHICLE INSURANCE
ESTIMATE

CROSS-REFERENCE TO RELATED
APPLICATIONS

This application claims priority to U.S. Provisional Patent Application No. 61/890,986, filed Oct. 15, 2013.

BACKGROUND OF THE INVENTION

1. Field of the Invention

The subject matter disclosed generally relates to a method and system for generating an insurance estimate for a damaged vehicle.

2. Background Information

When a vehicle such as an automobile is damaged the owner may file a claim with an insurance carrier. A claims adjuster typically inspects the vehicle to determine the amount of damage and the costs required to repair the automobile. The owner of the vehicle or the vehicle repair facility may receive a check equal to the estimated cost of the repairs.

The repair costs and other information may be entered by the adjuster into an estimate report. After inspection the adjuster sends the estimate report to a home office for approval. To improve the efficiency of the claims process there have been developed computer systems and accompanying software that automate the estimate process. By way of example, the assignee of the present invention, Audatex, Inc., ("Audatex") provides a software product under the trademark Audatex Estimating that allows a claims adjuster to enter estimate data. The data includes a list of damaged parts. The parts can be selected by entering text describing the part(s) or by selection of a graphical depiction of the vehicle part(s). The Estimating product includes a database that provides the cost of the selected parts and the labor cost associated with repairing the parts. The Estimating product is utilized by an estimator who must visit the damaged vehicle to generate the estimate. It would be desirable to provide a product that would allow a consumer to remotely provide information to an insurance estimator.

BRIEF SUMMARY OF THE INVENTION

An apparatus and method for generating a damaged vehicle estimate for a damaged vehicle. A mobile device is used to capture a photo image of a damaged vehicle and receive vehicle information from a user. The mobile device displays a graphical image of the damaged vehicle. A user can provide input on the graphical image that indicates a location of damage on the damaged vehicle. The photo image, marked graphical image and the vehicle information are transferred from the mobile device to a computer where a damaged vehicle estimate is generated. The damaged vehicle estimate is transferred to the mobile device and displayed to a user.

BRIEF DESCRIPTION OF THE DRAWINGS

FIG. 7 is an illustration showing an insurance claim page;

FIG. 8 is an illustration showing an insurance estimating page that allows a user to select damaged parts;

FIG. 9 is an illustration showing an estimate page that provides an damaged vehicle insurance estimate; and, FIG. 10 is an illustration showing a mobile device displaying a damaged vehicle insurance estimate.

DETAILED DESCRIPTION

Disclosed is a device and method for obtaining a damaged vehicle insurance estimate through a mobile device such as a cell phone. A user can load an application on their cell phone that can be utilized to request and receive an estimate for repairing a damaged vehicle. The application may request user information including an identification of the vehicle make, model and year. A three dimensional graphical depiction of the vehicle is downloaded and depicted on the mobile device. Using an input device such as a finger or pen the user can mark the areas of damage on the graphical vehicle. Levels of damage severity can be created by multiple inputs. For example, the user can repeatedly tap the same area of the display to show a deeper dent on the exterior of the vehicle. The application may also prompt the user to take photo images of the damaged vehicle. The application displays a graphic overlay of the vehicle. The user can manipulate the mobile device so that an image of the vehicle is aligned with the graphical overlay of the vehicle. The user then captures the photo image. The graphical overlay can be oriented on the screen in a manner so that the stored image of the vehicle is captured at a predetermined horizontal angle, vertical height and/or vehicle size. The marked three dimensional graphical representation of the vehicle, the photo images and the vehicle information are uploaded to an estimating computer. An estimator views the vehicle information, marked graphical representation and the photos and generates an estimate. The estimate is then downloaded to the mobile device. The user can view the estimate. The mobile device application may also provide listings and map views of repair shops available in the user's area. The application may also allow the user to track repair status updates. Although an insurance estimate is discussed, it is to be understood that the present invention can be utilized to perform shop and/or consumer estimates.

Figure 1:
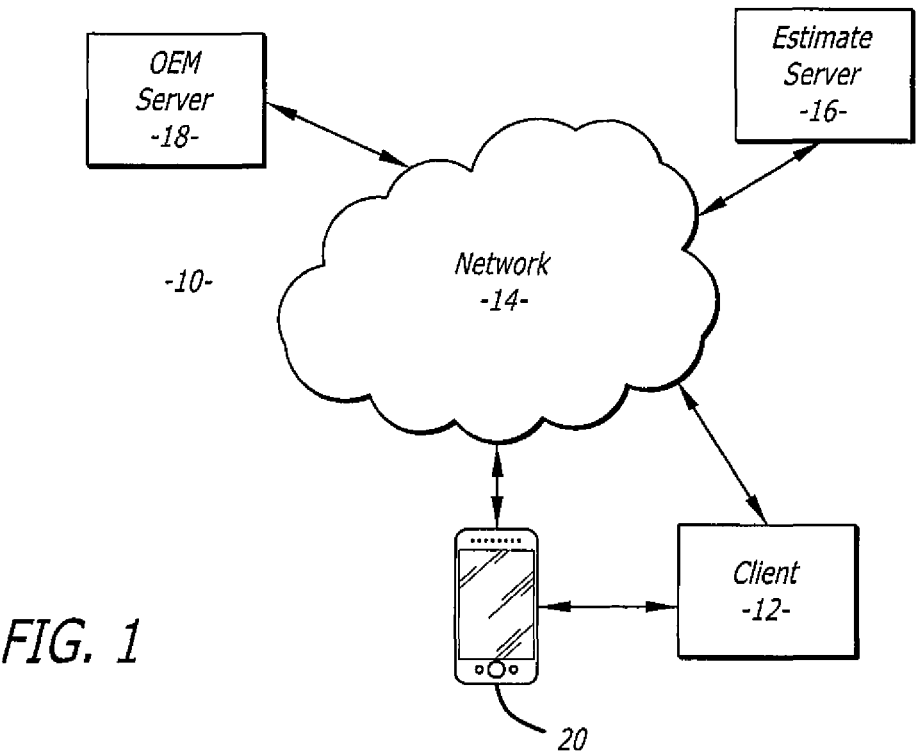
FIG. 1 is a schematic of a network system that can be used to generate an repair cost estimate for a damaged vehicle.

Referring to the drawings more particularly by reference numbers, FIG. 1 shows a system 10 that can be used to generate a damage estimate for a damaged vehicle. The system 10 may include at least one client 12 that is connected to an electronic communication network 14. The electronic communication network 14 may be a wide area network (WAN) such as the Internet. Accordingly, communication may be transmitted through the network 14 in TCP/IP format. The client 12 could be any type of device that can access the network 14.

The system 10 may further include an claim server 16 connected to the network 14. The claim server 16 may provide a web based portal that provides access to a repair cost estimate and/or a vehicle valuation web site. The web site may provide one or more web pages that can be used by a representative to generate a repair cost estimate and/or a vehicle valuation. By way of example, the representative may utilize the web pages to determine the estimate and/or a vehicle valuation of a vehicle, or claims adjuster submitting vehicle information on a theft claim, or a policy system that requires vehicle data to provide a price quote. Although one claim server 16 is shown, it is to be understood that the claim server may include two or more separate servers including a web server and an application server that together perform various functions.

The system may also include an OEM server 18 that can be coupled to the claim server 16 and clients 12 through the network 14. The OEM server 18 may contain a database that includes vehicle model information and vehicle option information. The OEM server 18 may provide vehicle model information and vehicle options information based on a VIN. Although a web based system is shown and described, it is to be understood that a non-web based system could be employed.

The system 10 includes a mobile device 20 that can be used to capture images and information of a vehicle. The device 20 may be a smartphone, tablet or a similar device that contains a camera and a screen. The mobile device 20 may be coupled to the client 12.

Figure 2:
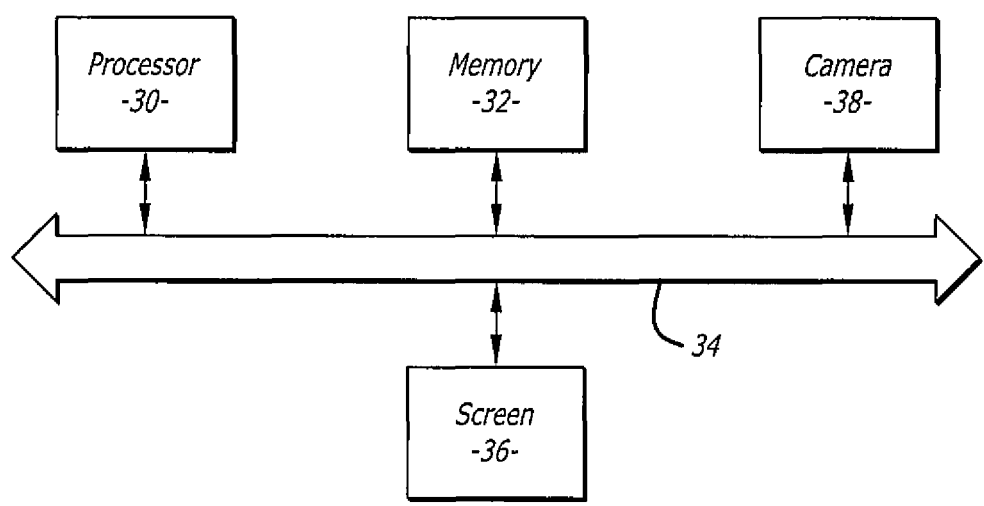
FIG. 2 is a schematic of a mobile device of the system.

FIG. 2 shows an embodiment of a mobile device 20. The camera device 20 includes a processor 30 connected to one or more memory devices 32 through a bus 34. The memory device 32 may include both volatile and non-volatile memory such as read only memory (ROM) or random access memory (RAM). The processor 30 is capable of operating software programs in accordance with instructions and data stored within the memory device 32. Without limiting the scope of the invention the term computer readable medium may include the memory device 32. The computer readable medium may contain software programs in binary form that can be read and manipulated by the processor 30.

The mobile device 20 further includes a screen 36 and a camera 38. The device 20 may also include transceivers and network ports to communicate with external sources such as the servers 16 and 18 shown in FIG. 1.

The servers 16 and 18 may contain relational databases that correlate data with individual data fields and a relational database management system (RDBMS). The RDBMS of the server 16 may include a reference to a website that can be accessed by the client 12 and/or camera device 20. The website has one or more specific uniform resource locators (URL) that can be used to access the site through the network 14. The URL can be entered through a web-based application resident in the client computer 12 and/or device 20. By way of example, the web based application may be a browser. Servers 16 and/or 18 may contain a database of graphic overlays that are associated with vehicle information. The servers 16 and/or 18 may also contain three dimensional graphical representations of vehicles that are searchable from vehicle information such as the make, model and year of a car.

Figure 3:
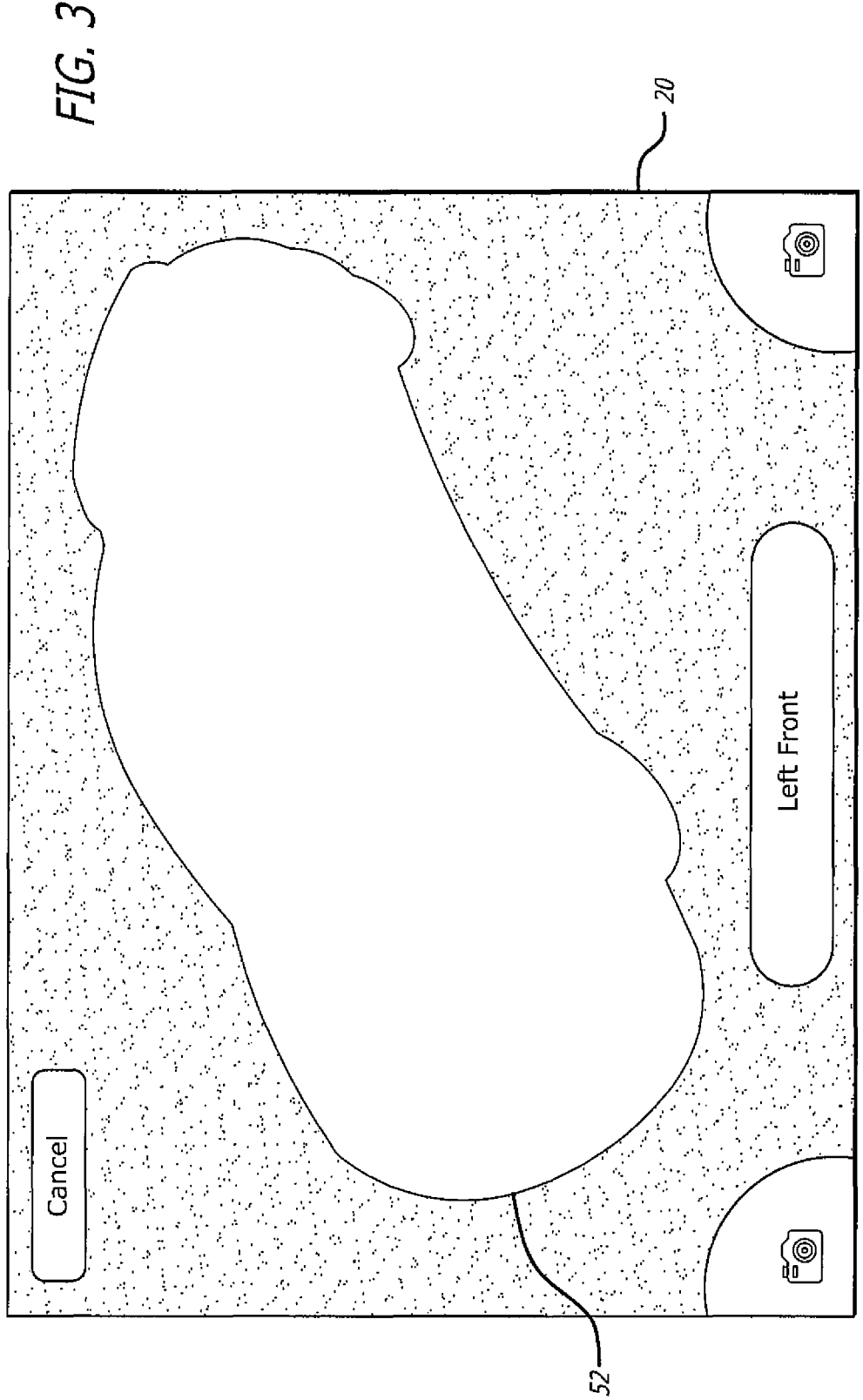
FIG. 3 is an illustration showing a mobile device displaying a graphical overlay of a vehicle.
Figure 4:
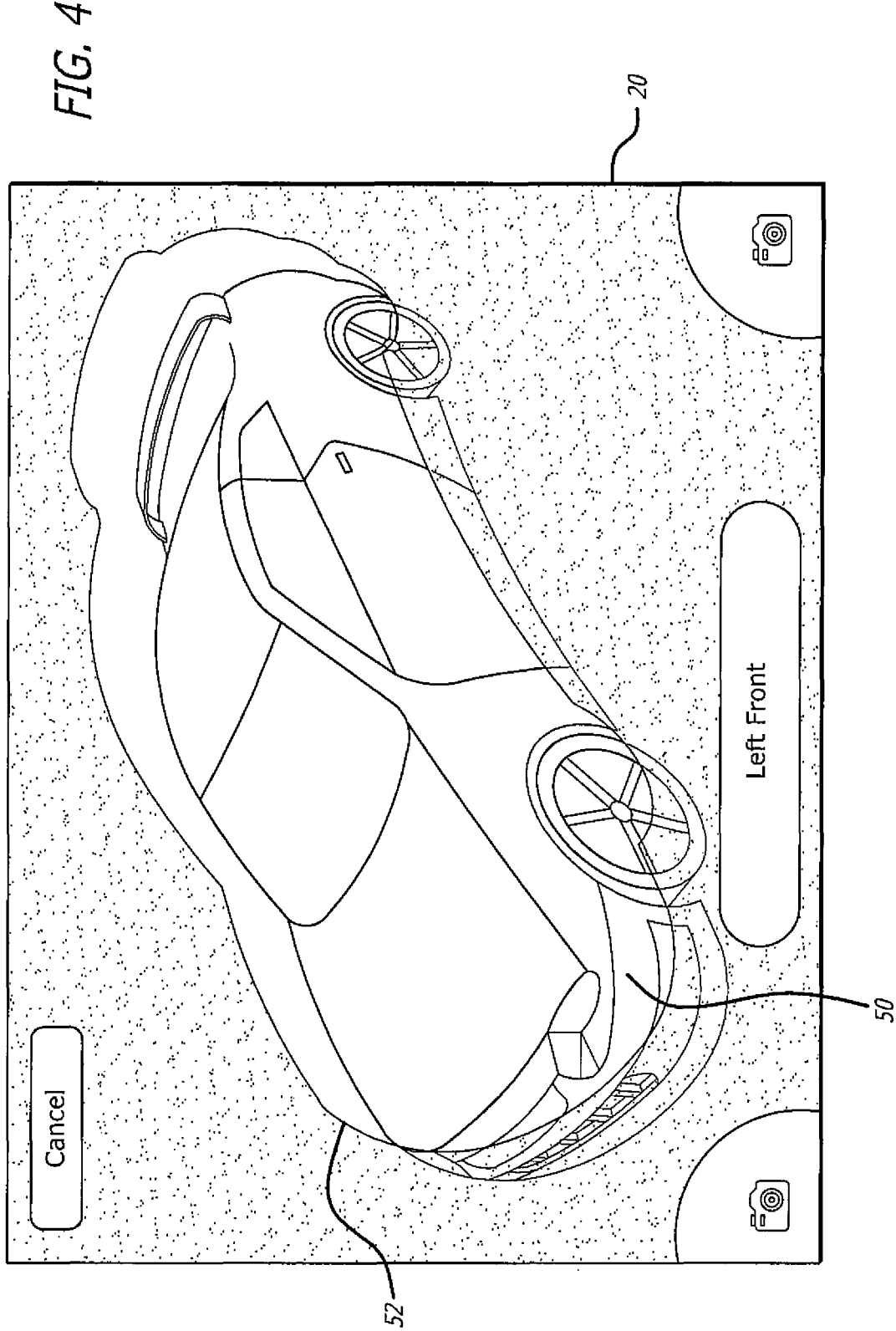
FIG. 4 is an illustration showing a mobile device displaying a graphical overlay of a vehicle and a photo image of the damaged vehicle out of alignment.
Figure 5:
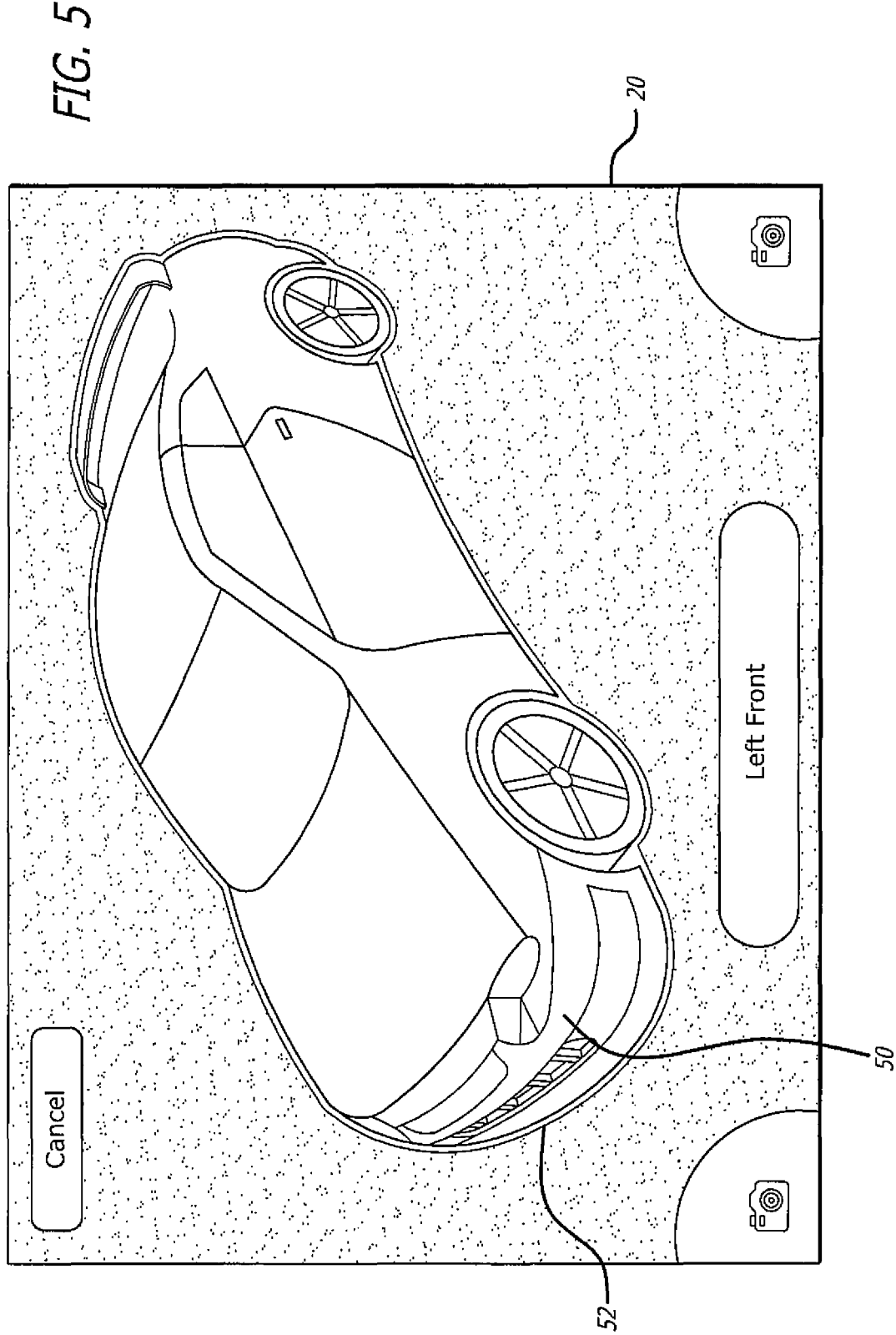
FIG. 5 is an illustration showing the photo image of the damaged vehicle in alignment with the graphical overlay.

FIGS. 3, 4 and 5 show how a photograph of a vehicle 50 can be captured using a graphic overlay 52 The user can enter information regarding the vehicle. For example, the user can input the year, make and model of the vehicle. A graphical overlay 52 of the identified vehicle is displayed on the mobile device 20 as shown in FIG. 3. As shown in FIG. 4, the user can then operate the camera device to obtain an image of the vehicle 50 that is displayed with the graphical overlay 52. The graphical overlay 52 may be transparent so that the user can see the image of the vehicle. Although a process wherein the overlay 52 is displayed before the image of the vehicle 50, it is to be understood that the process may be reversed so that the vehicle 50 can be displayed before the overlay 52.

The user can move the camera to align the vehicle image 50 with the graphical overlay 52 as shown in FIG. 5. The vehicle image 50 can be stored in memory when the image 50 is aligned with the graphical overlay 52. This can be accomplished by the user "clicking" the camera to capture the image of the vehicle 50. The graphical image 52 can be displayed in a manner so that the stored image has a predetermined horizontal angle, vertical height, size, resolution and/or quality. The stored image may be provided with an insurance estimate. Creating standardized image parameters such as horizontal angle and height promotes consistency and uniformity in the estimating process.

The graphical overlay 52 can be created by extrapolating a 2D image showing only the outline and various highlights of the vehicle from a 3D model of the vehicle. The area between the outline may be shaded but still transparent when overlayed onto the video image captured by the camera. The color of the shaded area and outlines can be varied. For example, the shaded area and outlines may be gray, but the user can change the color to yellow. This would be desirable if the vehicle is gray and would be difficult to distinguish from a gray shaded area and outline. Some vehicle components, such as the front driver side wheel may be created in the overlay 52. This would allow the user to align the wheel of the image captured by the camera with the graphical wheel provided by the overlay.

By way of example, the assignee Audatex has a database(s) that contains 3D models of various vehicles. The overlays may be created from these 3D models. For example, the 3D models can be rotated and otherwise manipulated to achieve the desired horizontal angle, vertical height and vehicle size. The outline of the 3D model is then extrapolated to create the overlay 52. Overlays for various vehicles can be created and stored in a database(s).

Figure 6:
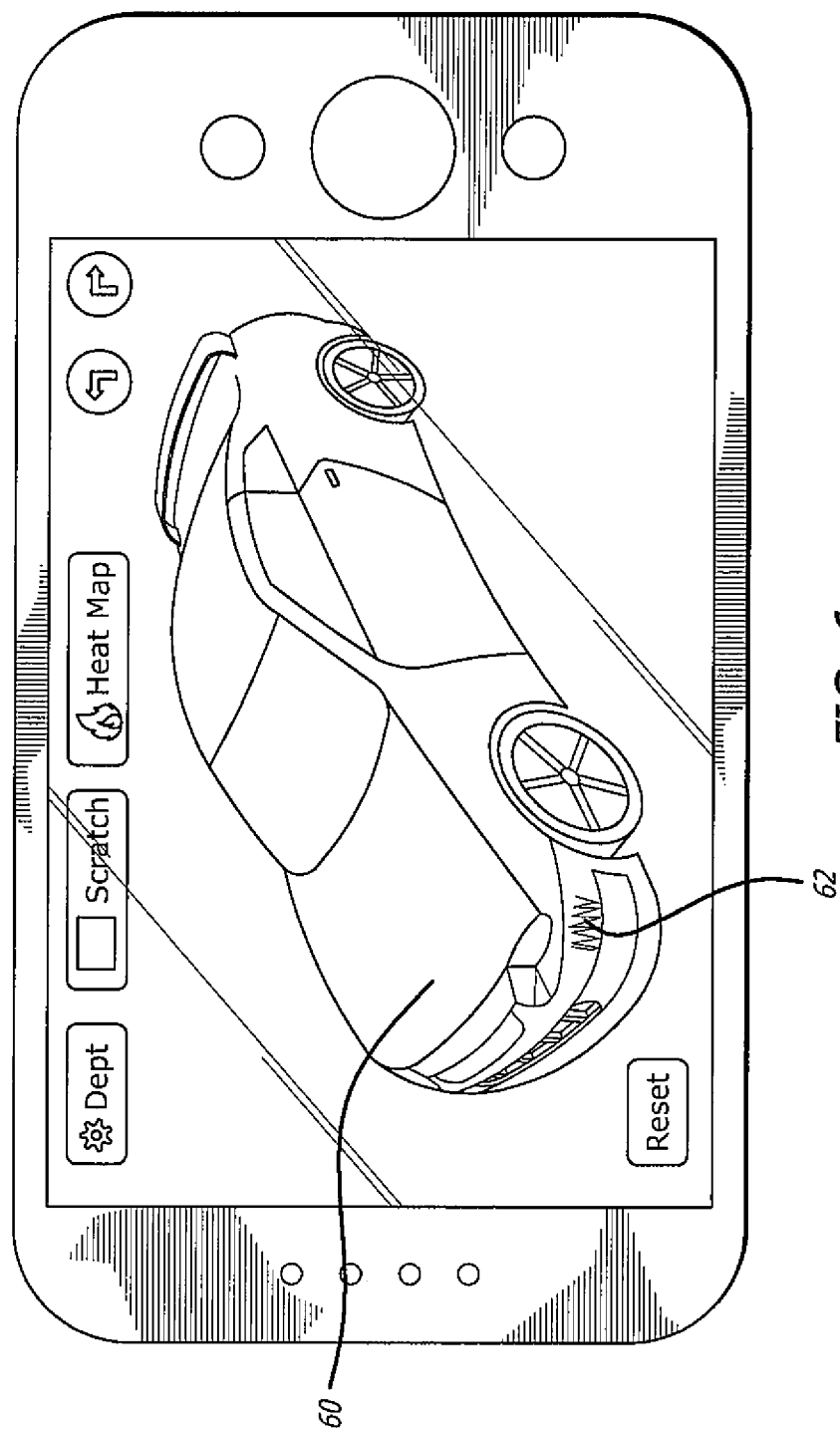
FIG. 6 is an illustration showing a graphical image of a vehicle displayed by the mobile device.

FIG. 6 shows a three dimensional graphical depiction of a vehicle 60. The user can provide input such as tapping the screen to mark the damaged areas 62 of the vehicle. Further tapping on a damaged area may be used to indicate more severe damage.

The photo images of the vehicle and the marked graphical representation can be uploaded and used in a process to create an insurance estimate. FIG. 7 shows an example of a claim page 100 used to create an insurance estimate. The claim page may include a VIN field 102 that allows a user to enter a VIN. The page 100 may include vehicle information fields, including but not limited to ORIGIN 104, MAKE 106, YEAR 108, MODEL 110, STYLE 112, ENGINE 114 and TRANSMISSION 116, exterior and interior Paint code, color, refinish type and production date fields. The page may further include vehicle package fields 118 and vehicle option fields 120 that can be selected and deselected to indicate the options of a vehicle. Entering the VIN may automatically populate certain fields of the page 100.

Figure 8:
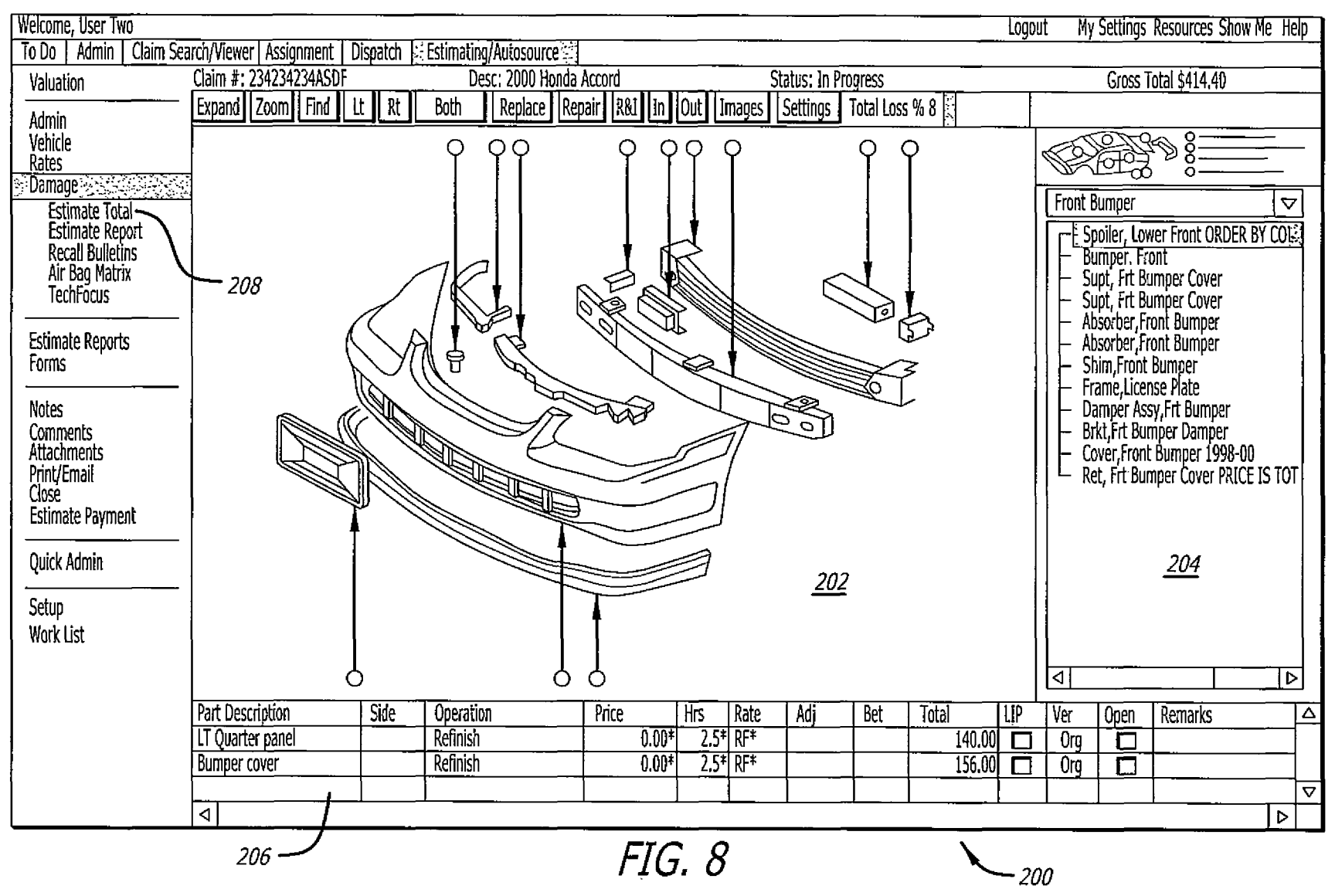
Figure 9:
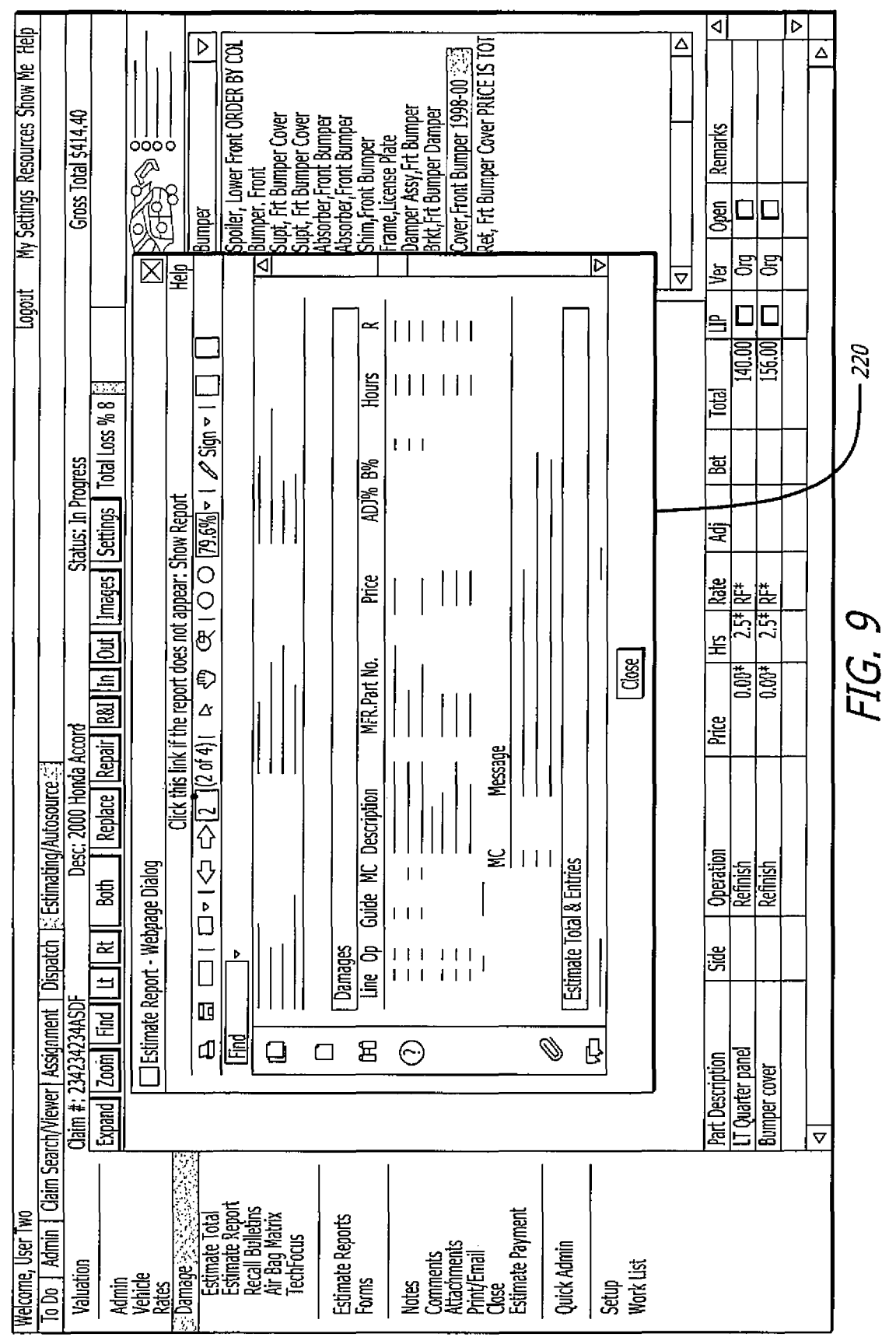

A representative may enter and/or select damaged parts for the vehicle. FIG. 8 shows an example of an estimating page 200 that allows the user to enter and/or select damaged parts of a vehicle. The page 200 may include a graphical section 202 that can be selected by the representative and a text section 204 that lists a plurality of selectable parts for the vehicle. The parts that are selected to be replaced or repaired can be listed in section 206. An estimate page can be displayed by selecting the "Estimate Total" link 208 shown in FIG. 7. FIG. 9 shows a page 220 that displays a running cost total of the estimated damage of the vehicle.

The process may have a feature (not shown) that provides a warning to the representative that the cost total exceeds a "totaled" value at which point the representative may discontinue the process and request a vehicle valuation. After all of the parts to be repaired or damaged are selected the representative may obtain a final repair cost estimate and/or vehicle valuation. The photograph of the vehicle can be associated with the estimate. For example, the photograph can be attached to the estimate file.

Figure 10:
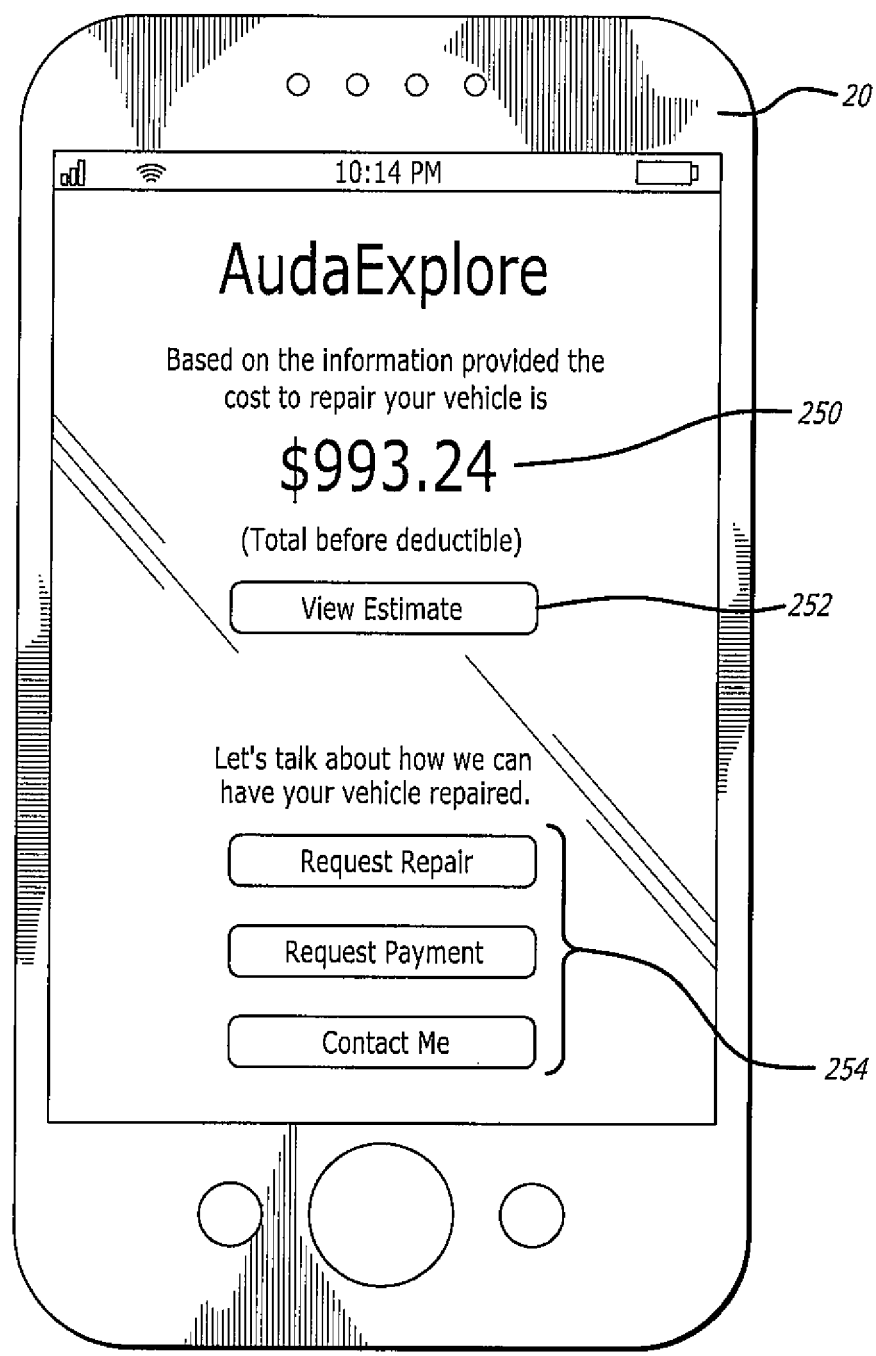

Referring to FIG. 10, the estimate can be downloaded to the mobile device 20 and displayed by the device screen. The repair value 250 can be displayed by the device. A button 252 that allows the user to view further details regarding the estimate can also be displayed. The mobile device 20 may also display REQUEST REPAIR, REQUEST PAYMENT and CONTACT ME buttons 254.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A method for generating a damaged vehicle estimate for a damaged vehicle, comprising:
   capturing, by a mobile device, a photo image of the damaged vehicle;
   displaying, by the mobile device, a graphical overlay that is in a shape that has an outline of the damaged vehicle, the graphical overlay being located at a predetermined orientation relative to a screen of the mobile device, the predetermined orientation including a standardized horizontal angle and a standardized vertical height;
   displaying, by the mobile device, a graphical image of the damaged vehicle;
   receiving, by the mobile device, user input on the graphical image that indicates a location of damage on the damaged vehicle;
   determining that the user input on the graphical image comprises a plurality of taps on a particular part of the damaged vehicle;
   determining a level of severity of the damage on the damaged vehicle based on the determined plurality of taps;
   creating, by the mobile device using the user input and the graphical image, a marked graphical image;
   receiving, by the mobile device, user input regarding vehicle information; and
   displaying, by the mobile device, the damaged vehicle estimate, wherein the damaged vehicle estimate is created using the photo image, the marked graphical image, the determined level of severity of the damage, and the vehicle information.

2. The method of claim 1, wherein the vehicle information comprises a vehicle make, a vehicle model and a vehicle year.

3. The method of claim 1, wherein the graphical overlay is generated from a three dimensional model of an undamaged vehicle.

4. The method of claim 1, further comprising displaying on the mobile device a listing of repair shops for the damaged vehicle.

5. The method of claim 1, wherein the mobile device is a cell phone.

6. A non-transitory computer program storage medium, comprising computer-readable instructions for generating a damaged vehicle estimate for a damaged vehicle, execution of said computer-readable instructions by at least one processor of a mobile device performs the steps of:
   capturing a photo image of the damaged vehicle;
   displaying a graphical overlay that is in a shape that has an outline of the damaged vehicle, the graphical overlay being located at a predetermined orientation relative to a screen of the mobile device, the predetermined orientation including a standardized horizontal angle and a standardized vertical height;
   displaying a graphical image of the damaged vehicle;
   receiving user input on the graphical image that indicates a location of damage on the damaged vehicle;
   determining that the user input on the graphical image comprises a plurality of taps on a particular part of the damaged vehicle;
   determining a level of severity of the damage on the damaged vehicle based on the determined plurality of taps;
   creating, using the user input and the graphical image, a marked graphical image;
   receiving user input regarding vehicle information; and
   displaying the damaged vehicle estimate, wherein the damaged vehicle estimate is created using the photo image, the marked graphical image, the determined level of severity of the damage, and the vehicle information.

7. The non-transitory computer program storage medium of claim 6, wherein the vehicle information comprises a vehicle make, a vehicle model and a vehicle year.

8. The non-transitory computer program storage medium of claim 6, wherein the graphical overlay is generated from a three dimensional model of an undamaged vehicle.

9. The non-transitory computer program storage medium of claim 6, further comprising displaying on the mobile device a listing of repair shops for the damaged vehicle.

10. The non-transitory computer program storage medium of claim 6, wherein the mobile device is a cell phone.

11. A system, comprising:
   a camera;
   a screen;
   one or more memory devices; and
   a processor communicatively coupled to the one or more memory devices, the processor operable to:
   capture, using the camera, a photo image of a damaged vehicle; display, on the screen, a graphical overlay that is in a shape that has an outline of the damaged vehicle, the graphical overlay being located at a predetermined orientation relative to the screen of the mobile device, the predetermined orientation including a standardized horizontal angle and a standardized vertical height;
   display, on the screen, a graphical image of the damaged vehicle on the mobile device;
   receive user input on the graphical image that indicates a location of damage on the damaged vehicle;
   determine that the user input on the graphical image comprises a plurality of taps on a particular part of the damaged vehicle;
   determine a level of severity of the damage on the damaged vehicle based on the determined plurality of taps;
   create, using the user input and the graphical image, a marked graphical image;
   receive user input regarding vehicle information; and
   display, on the screen, a damaged vehicle estimate, wherein the damaged vehicle estimate is created using the photo image, the marked graphical image, the determined level of severity of the damage, and the vehicle information.

\* \* \* \* \*